June 15, 1965  T. R. SCHMIDT  3,189,819
METHOD FOR DETECTING THE PRESENCE OF CATHODIC PROTECTION
CURRENTS ON PIPELINES
Filed April 9, 1962

INVENTOR:
T. R. SCHMIDT

BY: Theodore E. Bieber

HIS ATTORNEY

3,189,819
METHOD FOR DETECTING THE PRESENCE OF CATHODIC PROTECTION CURRENTS ON PIPELINES
Thomas R. Schmidt, Lafayette, Calif., assignor to Shell Oil Company, New York, N.Y., a corporation of Delaware
Filed Apr. 9, 1962, Ser. No. 186,106
5 Claims. (Cl. 324—72)

This invention relates to pipelines and more particularly to a method and apparatus for detecting the presence of electrical currents along pipelines wherein the apparatus is in the form of a self-contained instrument that may be transported through the pipeline by fluid flow therein.

Most pipelines have electrical currents applied thereto to counteract or equalize the currents generated by the cathodic action between the pipeline and the surrounding earth. These currents are normally referred to as cathodic protection currents and are necessary to limit corrosion of the pipeline as a result of the electrolytic action between the pipeline and the earth formation. It is important that the current flow completely along the pipeline to prevent the corrosion thereon. In order to insure that the current flows along the pipeline, the current is applied at a plurality of positions spaced along the pipeline to insure a current flow.

In the past it has been customary to make a periodic potential survey to insure that the cathodic protection currents are present along the pipeline. The potential surveys are normally conducted by having an operator walk along the pipeline and place a probe into the ground adjacent the pipeline to measure the potential between the earth and the pipeline. This, of course, necessitates numerous insertions of the probe into the earth adjacent the pipeline. Due to the manual nature of this type of potential probe, they are very time-consuming and very costly to conduct.

In addition to the cost and the time consumed in the manual potential surveys the actual results obtained are questionable. It is very difficult to correlate the potential survey with the current flow along the pipeline to ascertain that the cathodic protection current is present along the pipeline.

In addition to the detection of cathodic protection currents, it is often necessary to ascertain the presence of stray electrical currents adjacent pipelines. These currents can result from cathodic protection currents on adjacent pipelines or other sources.

Accordingly, it is the principal object of this invention to provide a self-contained apparatus which may be inserted into the pipeline and transported therethrough by fluid flow. The apparatus detects the presence of electrical currents on the pipeline and records the detected currents on a record in a predetermined relationship to the position of the apparatus in the pipeline.

A further object of this invention is to provide a self-contained instrument that detects electrical currents along the pipeline wherein the electrical current is a fluctuating current.

A further object of this invention is to provide a self-contained instrument for detecting a cathodic protection current, which instrument includes a means for generating a local electromagnetic field that bears a fixed relationship to the frequency of the rectified alternating current used for cathodic protection. The frequency of the generated electromagnetic field is chosen so as to cause a heterodyning effect between the frequency of the ripple remaining in the cathodic protection current and the frequency of the electromagnetic field.

The above objects and advantages of this invention are achieved by providing and instrument having a means for generating a local electromagnetic field. The instrument also includes a detecting means spaced from the generating means and capable of detecting both the electrical currents generated by the electromagnetic field and the fluctuations of the electrical current to be detected. Normally, cathodic protection currents are rectified unfiltered alternating currents, but in those cases where a filtered direct current power supply is used for the cathodic protection currents, one may introduce a ripple therein. Likewise, the normally cathodic protection currents may be replaced with an alternating current during the surveying of the pipeline. The frequency of the electromagnetic field is chosen so that the ripple in the cathodic protection current and the electrical currents generated by the electromagnetic field will interact to cause a heterodyning effect when the two signals are supplied to a tuned amplifier. While a tuned amplifier is preferred, the frequency response of the amplifier could have a relatively large range and results still be achieved. Likewise, the frequency difference between the applied field and the ripple of the cathodic protection current is not critical but is preferably limited to a difference of few cycles per second.

The heterodyning effect generated by the interaction of the two signals causes the amplifier to have an output which varies from a minimum to a maximum. This variance can then be recorded by various means, for example, photographic means or magnetic tape means. The recording medium is transported by the recording means at a speed that bears a relationship to the travel of the instrument through a pipeline. The frequency of the recorded signal is then proportional to the difference in frequency between the ripple frequency and the frequency of the generated electrical currents and its amplitude will vary with the strength of the detected current.

The above objects and advantages of this invention will be more easily understood from the following detailed description when taken in conjunction with the attached drawing in which.

Figure 1:
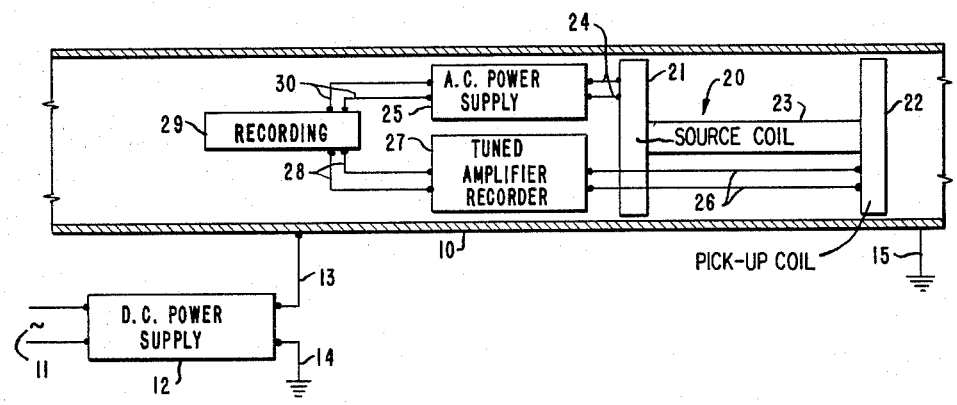
FIGURE 1 is a block diagram showing one embodiment of the invention.

Referring now to FIGURE 1 there is shown a portion of a pipeline 10 having a cathodic protection current applied thereto. The cathodic protection current is illustrated as being a rectified unfiltered alternating current from a source 12. One side of the source 12 is coupled to an alternating current power supply 11 and the other side is coupled to one end of the pipeline by a lead 13 and grounded at 14. The pipeline is likewise grounded at 15, thus completing the circuit with the source 12. While a rectified unfiltered alternating current is illustrated as the source of a cathodic protection current, obviously other types of electrical currents could be used. For the proper operation of this invention it is necessary to apply a fluctuating current to the pipe line as the cathodic protection current. This fluctuation in the current can be the result of the ripple remaining in an unfiltered but rectified alternating current or in the alternative normal alternating current may be used. While the frequency of the fluctuations is not critical, they must be uniform and fixed and in addition preferably of relatively low frequency. The ripple remaining when normal 60-cycle alternating current power is rectified provides very satisfactory results, as will be explained below.

Disposed within the pipeline is an apparatus 20 constructed in accordance with this invention. The apparatus 20 has a source coil 21 and a pick-up coil 22 disposed upon a suitable mounting member 23. In addition, the pick-up coil 22 should be spaced from the source coil 21 a distance at least equal to the diameter of the pipeline 10. The utilization of this minimum spacing insures that substantially no direct coupling will exist between the two coils and that all of the magnetic flux that is received by the pick-up coil 22 will have penetrated the wall of the pipeline. The construction and mounting of the coils may take any desired form. A suitable construction is shown and described in a copending application of T. R. Schmidt, entitled "Pipe Line Inspection Device," Serial No. 121,508, filed July 3, 1961.

The source coil is coupled by means of leads 24 to an alternating current power supply 25. The alternating current power supply may be of any desired design, for example, a battery-operated free-running oscillator as shown and described in the above-referenced copending application. The frequency of the power supply should bear a fixed relationship to the frequency of the alternating current source 11. This fixed relationship should be chosen so as to cause a heterodyning effect between the two sources as explained below. Excellent results have been achieved where the power supply 25 was a free-running oscillator having a period that was adjusted to result in a 60-cycle-per-second output. While the power supply 25 was adjusted for a nominal 60 cycles, its frequency, of course, varied a few cycles per second, while the source 11 being a normally commercial 60-cycle power supply maintained a relatively fixed frequency. Normal commercial 60-cycle power is relatively steady but will vary a few cycles, and this will be sufficient to give a heterodyne effect with the generated electrical current. The above is one example of suitable frequencies that may be used and other combinations may also be used, including currents having a greater difference in frequency than described above.

The pick-up coil 22 is coupled by means of leads 26 to a tuned amplifier 27 that is tuned to respond to the nominal frequency of the two power supplies 11 and 25, for example, 60 cycles. While it is preferable to use a tuned amplifier, obviously a normal amplifier would operate satisfactorily, although improved results are obtained with an amplifier tuned to the proper frequency. The output side of the amplifier is coupled by means of leads 28 to a recording mechanism 29. The power supply 25 is also coupled to the recording mechanism 29 by means of leads 30. The recording mechanism should preferably determine the difference in phase between the signal received from the pick-up coil 22 and the power supply 25 and record this phase difference on a suitable medium. A phase-detecting and recording mechanism is shown in the above-referenced copending application. This recording mechanism records the phase difference on a photographic film in which the portion of the film that is exposed is directly related to the magnitude of the phase difference.

The above-described instrument is operated in the same manner as described in the copending application. More particularly, the instrument is inserted into the pipeline and transported through the pipeline by means of the fluid flow in the pipeline. In order to be transported by the fluid flow, suitable pistons or cup shaped rubber members are mounted on the instrument and effectively sealed against the inner wall of the pipeline 10. Thus, the instrument will be transported through the pipeline at a speed that bears a relationship to the rate of flow of the fluid through the pipeline. As the instrument is transported through the pipeline the coil 21 will generate an electromagnetic field which will travel outwardly through the wall of the pipeline and return through the pipeline in the vicinity of the coil 22. This electromagnetic field will induce eddy currents in the pipeline that are detected by the pick-up coil 22. Similarly, the cathodic protection current coupled to the pipeline will induce eddy currents in the pipeline as a result of the fluctuations in the cathodic protection current. As explained above, it is preferable to use a rectified unfiltered alternating current for a cathodic protection current. The pick-up coil 22 will provide an output signal which is an algebraic sum and difference of the currents resulting from both of the above-described electrical currents. The amplitude of this output signal will have a maximum value when the two currents are in phase and a minimum value when they are 180 electrical degrees out of phase. Thus, the frequency of the two currents will have a heterodyning or beating effect in inducing a signal in the coil 22. The signal from the coil 22 is then supplied to the tuned amplifier 27 which amplifies the signal resulting from the currents while effectively rejecting signals due to extraneous noises in the pipeline. The signal from the amplifier is then supplied to the recorder that records the phase differences between the amplifier signal and the signal from the power supply 25. This phase difference will again have a maximum value when the signals are in phase and a minimum value when the signals are out of phase.

In addition to phase detection, the amplitude of the signal from amplifier 27 could also be recorded. A recording of the amplitude could be made by a recording galvanometer and would have an appearance similar to FIGURE 2.

Figure 2:
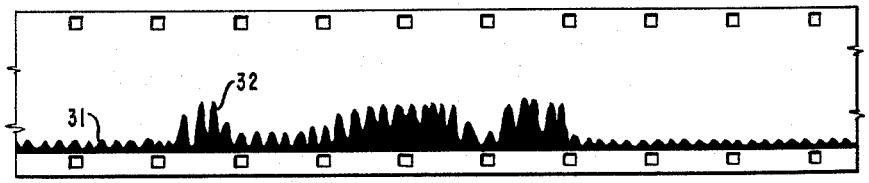
FIGURE 2 is a portion of an actual recording obtained utilizing the invention of FIGURE 1.

Referring to FIGURE 2, there is shown a portion of a record obtained when the above-described tool was operated in a pipeline. The logging tool was operated with the power supply 25 adjusted for a nominal 60-cycle per second and the cathodic protection current was supplied from a rectified but unfiltered commercial 60-cycle alternating current power supply. The instrument was transported through the pipeline at a speed that resulted in approximately one inch of the film strip shown in FIGURE 2 being equal to 100 feet of pipe. As shown in FIGURE 2, the record consists of a dark area that is a cross section of the pipe, with the dark area having a series of oscillating signals 31 and defect signals 32 superimposed upon each other. The defect signals 32 result from imperfections and anomalies such as pits, wall thinning, and so forth in the pipeline 10. The detection of these anomalies is more fully explained and described in the above-referenced copending application. The signals 31 result from the inneraction or heterodyning effect of the cathodic protection current and the generated electrical current. By examining a complete record of the pipeline, one can easily determine whether sufficient cathodic protection current is being applied to the pipeline. For example, if the signals 31 appear throughout the complete length of the record, it would indicate that the cathodic protection current exists for the complete length of the pipeline. Of course, the opposite is also true, i.e., if the signals do not appear on the complete record, it indicates that the cathodic protection currents are not present through the complete length of the pipeline. In some cases it may be possible to eliminate the source coil 21 and use only the pick-up coil 22 of the apparatus in FIGURE 1. The signal from the pick-up coil would be supplied to the tuned amplifier 27. The output signal of the tuned amplifier would be recorded on the recording mechanism 29. The recording mechanism 29 should include a phase detecting system that receives a reference signal from the free running oscillator or power supply 25. The use of phase detection will result in a record similar in appearance to the record shown in FIGURE 2.

As described in the above referenced copending application, it is possible to locate the position of a defect by weld joints between the sections of pipe. In a similar manner, one can locate the presence of cathodic protection currents or other currents on the pipeline. To locate the weld joints, the pipeline would be surveyed without the cathodic protection current to obtain a record showing the location of weld joints. This record can then be correlated with the cathodic protection record to obtain the desired locations.

The above-described tool can be operated with a minimum of personnel present and may traverse the pipeline at a speed on the order of 5 feet per second. Thus, a considerable length of the pipeline may be surveyed in a normal working day. Furthermore, the apparatus does not require the insertion of any probes into the ground to determine the potential between the pipeline and the ground. Thus, the survey of the pipeline is accelerated and the personnel required to survey the line reduced. The above acceleration of the survey is achieved while providing a continuous survey in contrast to the finite test points provided by former potential surveys of pipelines.

I claim as my invention:

1. A method for determining the presence of a cathodic protection current on a pipeline wherein the cathodic protection current is a rectified unfiltered alternating current having a remaining ripple current, said method comprising:

generating an alternating electromagnetic field adjacent said pipeline, said alternating electromagnetic field having a frequency different than the frequency of the rectified alternating current, the difference between said frequencies being sufficient to cause a heterodyne effect between said frequencies;

detecting heterodyne beat frequencies resulting from said generated alternating electromagnetic field and the ripple current remaining from said rectified alternating frequency;

coupling said detected currents to an amplifier tuned to a frequency between said frequencies;

and recording the output signal of said amplifier with relation to the position at which said resulting current was detected.

2. The method of claim 1 in which the location at which said resulting current is detected is determined by detecting and recording the presence of weld joints in the pipeline.

3. A method for determining the presence of a cathodic protection current on a pipeline wherein the cathodic protection current is a rectified unfiltered alternating current having a remaining ripple current, said method comprising:

generating an alternating electromagnetic field adjacent said pipeline to cause said electromagnetic field to penetrate the wall of said pipeline, the frequency of said electromagnetic field being related to the frequency of the rectified alternating current to cause a heterodyning effect between said frequencies;

detecting at a location spaced from said point of generating the heterodyne beat frequencies resulting from said generated electromagnetic frequency and the ripple current remaining from said rectified alternating frequency;

coupling said detected currents to an amplifier tuned to a frequency between said frequencies;

recording the output signal of said amplifier with relation to the position at which said frequencies were detected;

and moving the point at which said alternating electromagnetic field is generated along said pipeline.

4. A method for detecting the presence of direct current cathodic protection current on a pipeline comprising:

replacing said direct current cathodic protection current with an alternating current;

generating an alternating electromagnetic field adjacent said pipeline to cause said electromagnetic field to penetrate the wall of said pipeline, the frequency of said electromagnetic field being related to the frequency of the alternating current to cause a heterodyning effect between the frequencies;

detecting at a location spaced from said point of generating the heterodyne beat frequencies resulting from said generated electromagnetic frequency and said alternating current frequency;

coupling said detected currents to an amplifier tuned to a frequency between said frequencies;

and recording the output signal of said amplifier.

5. A method for determining the presence of an undulating current on a pipeline comprising:

generating an alternating electromagnetic field adjacent said pipeline to cause said electromagnetic field to penetrate the wall of said pipeline, the frequency of said electromagnetic field being related to the frequency of the undulating current to cause a heterodyning effect between said frequencies;

detecting at a location spaced from said point of generating the heterodyne beat frequencies resulting from said generated electromagnetic frequency and the undulating current;

coupling said detected currents to an amplifier tuned to a frequency between said frequencies;

recording the output signal of said amplifier with relation to the position at which said frequencies were detected;

and moving the point at which said alternating electromagnetic field is generated along said pipeline.

References Cited by the Examiner
UNITED STATES PATENTS

| | | | |
|---|---|---|---|
| 2,782,370 | 2/57 | Ver Nooy | 324—72 |
| 2,803,797 | 8/57 | Cowles | 324—29 |
| 3,091,733 | 5/63 | Fearon et al. | 324—37 |

WALTER L. CARLSON, *Primary Examiner.*